W. F. PETERSEN.
BAKER'S OVEN.
APPLICATION FILED SEPT. 12, 1913.
1,171,874.
Patented Feb. 15, 1916.
4 SHEETS—SHEET 1.
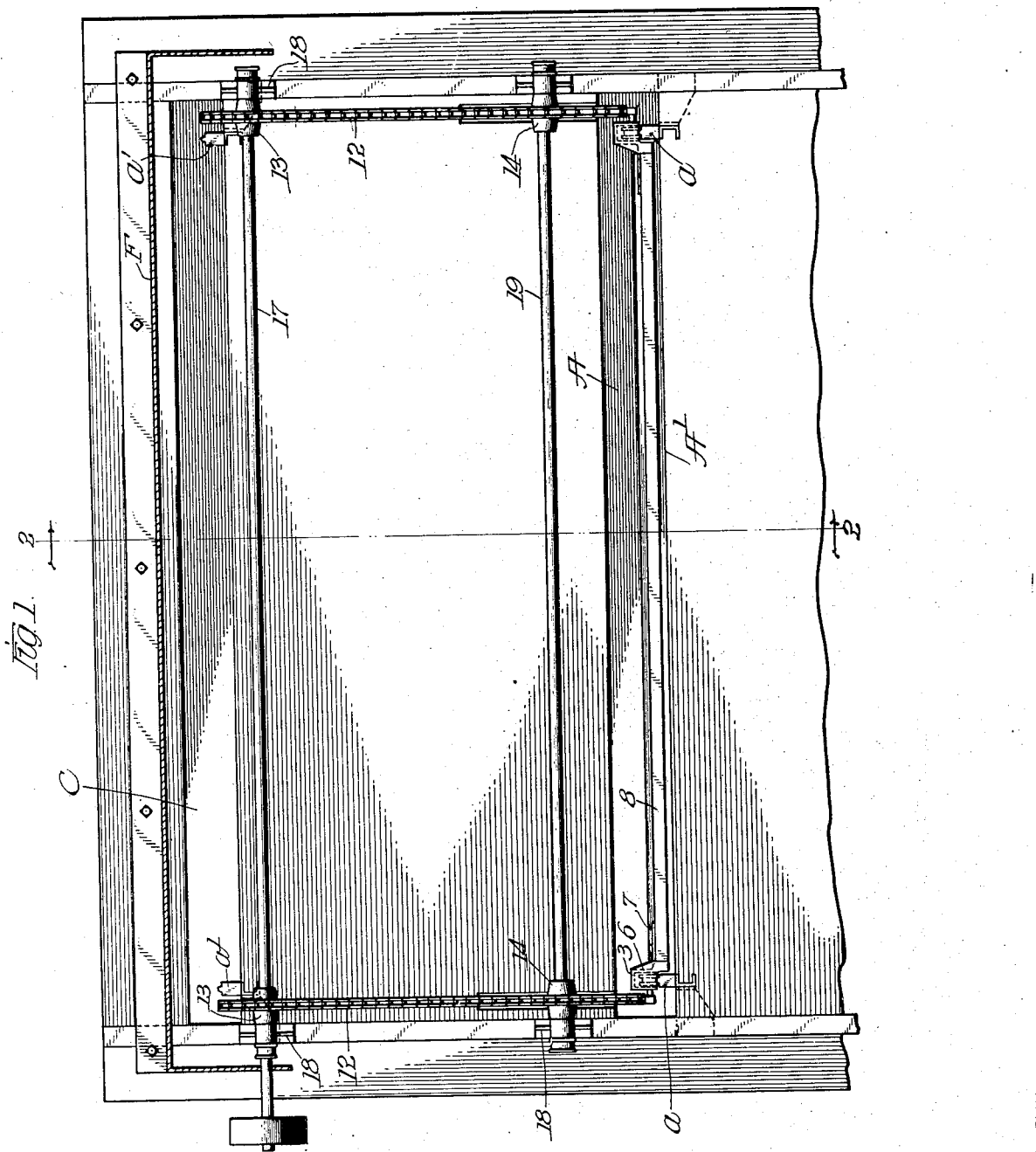
Witnesses:
Robert H. Weir
C. H. Roessner.
Inventor
William Ferdinand Petersen
By Frank D. Thomason
Atty.

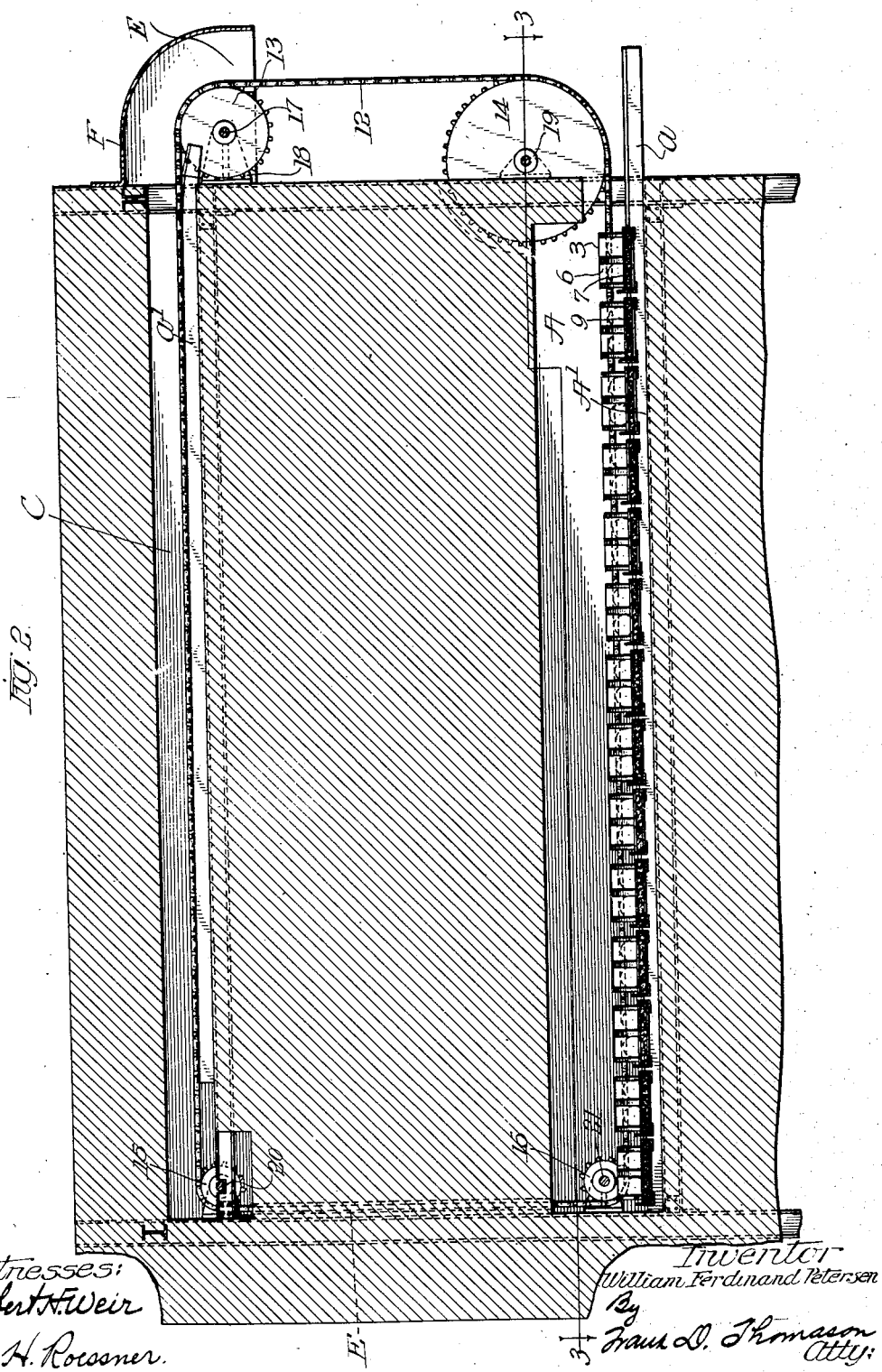

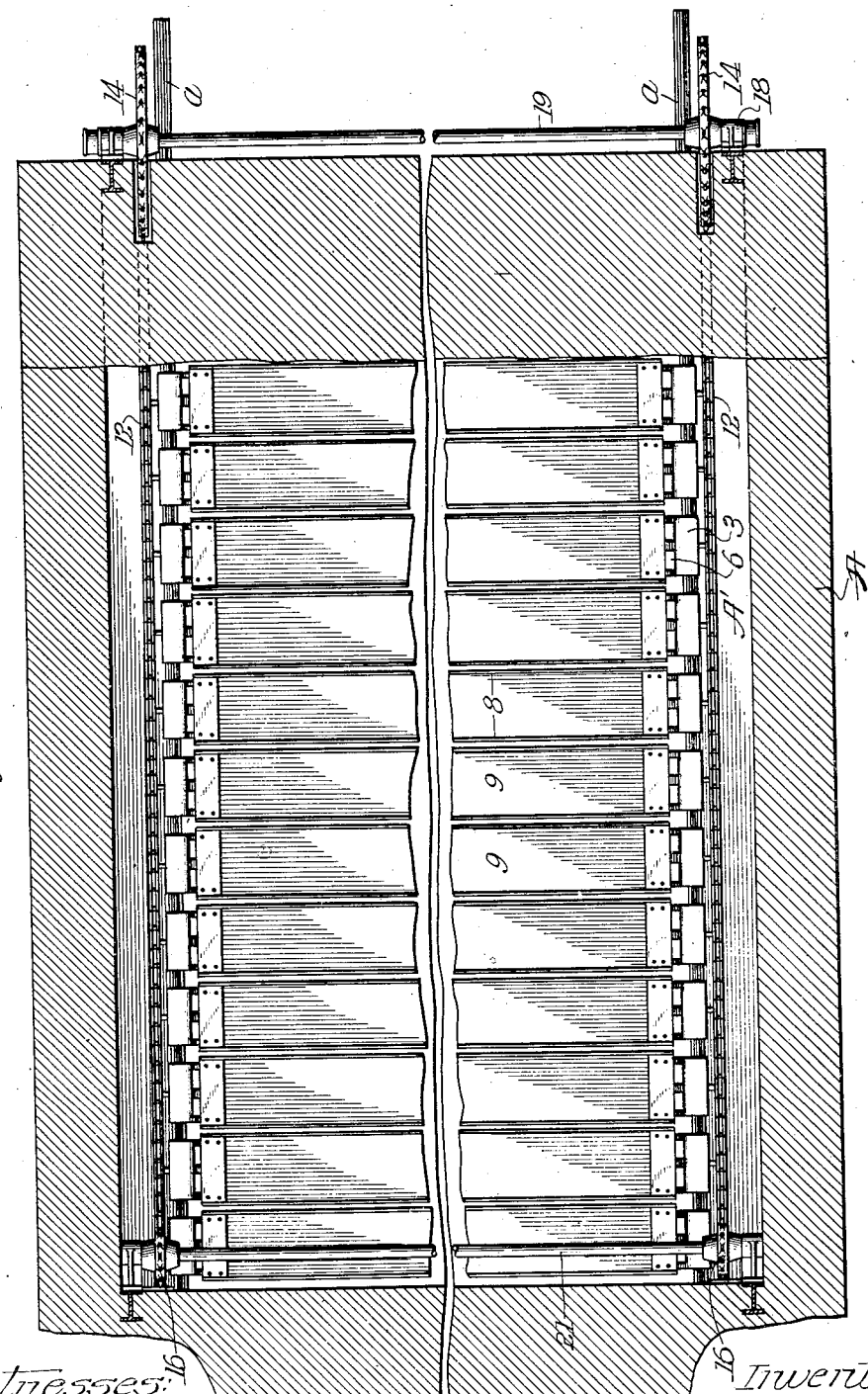

W. F. PETERSEN.
BAKER'S OVEN.
APPLICATION FILED SEPT. 12, 1913.
1,171,874.
Patented Feb. 15, 1916.
4 SHEETS—SHEET 4.
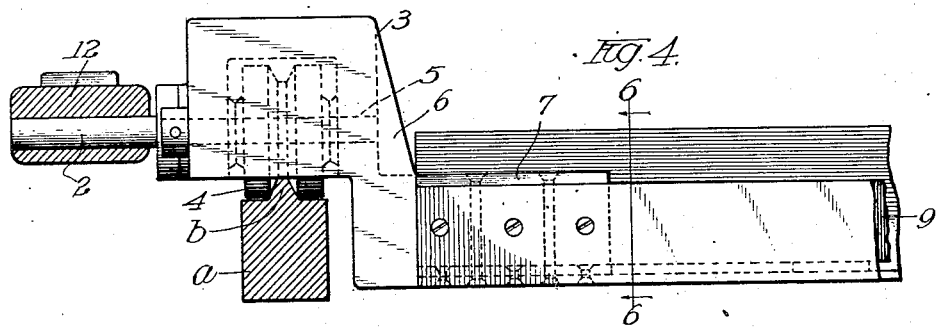
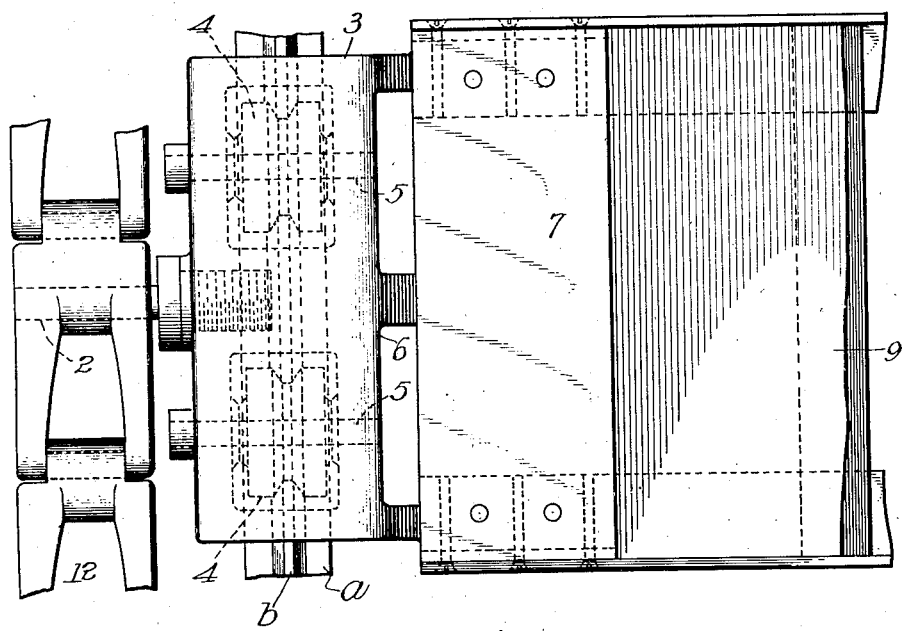
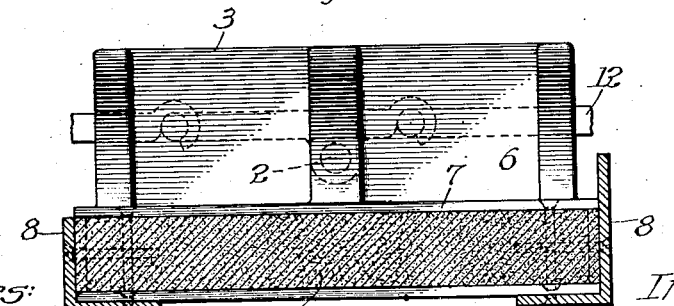

UNITED STATES PATENT OFFICE.

WILLIAM FERDINAND PETERSEN, OF CHICAGO, ILLINOIS.

BAKER'S OVEN.

1,171,874.  Specification of Letters Patent.  Patented Feb. 15, 1916.

Application filed September 12, 1913. Serial No. 789,416.

*To all whom it may concern:*

Be it known that I, WILLIAM FERDINAND PETERSEN, a citizen of the United States, residing at Chicago, in the county of Cook and State of Illinois, have invented new and useful Improvements in Bakers' Ovens, of which the following is a full, clear, and exact description.

My invention relates to bakers' ovens and more particularly to the class of ovens that are commercially known as "wide-mouth" ovens, that is, ovens having a door in the front wall thereof that extends across or nearly across said front wall such as disclosed in United States Letters Patent No. 975,889, granted to me November 15th, 1910, for improvements in "bakers' ovens."

The object of this invention is to provide suitable means for supporting the trays of dough or bread during the feeding, baking and discharging operations. These means comprise suitable mechanism that is adapted to receive the dough in pans or trays either by hand or from an automatic conveyer similar to that shown in my co-pending application for Letters Patent of the United States, Serial No. 717,495, filed August 28th, 1912.

Another important object of my invention is to provide a baker's oven with a compartment in which the trays can be kept warm after they have been moved out of the baking chamber thereof, and thereby prevent the waste of heat, and shorten the time required to bake the bread in the baking chamber. My improved mechanism carries said pans or trays into the oven where they remain during the baking process, and, upon the reversal of the movement thereof, return the pans or trays to the aforesaid warming chamber.

Another object of my invention is to construct this device in as simple a manner as possible so that it will be easy to operate, will not readily get out of order, and is capable of being installed in ovens of the "wide-mouth" type without altering the oven.

Still another object is to construct mechanism of this character that will operate successfully without creating a draft within the baking chamber of the oven during the feeding or peeling and removal operations.

These and other objects I accomplish by the means and in the manner hereinafter fully described and as more particularly pointed out in the claims, reference being had to the accompanying drawings in which like reference characters indicate similar parts in the various figures.

In the drawings: Figure 1 is a vertical front elevation of a baker's oven, having a portion of the front wall removed to disclose my improved mechanism applied thereto. Fig. 2 is a vertical longitudinal section taken on line 2—2, Fig. 1. Fig. 3 is a top plan view thereof. Fig. 4 is an enlarged front elevation of an end of one of the shelves showing the same in engagement with the track. Fig. 5 is an enlarged plan view of the same. Fig. 6 is a transverse section of one of the shelves taken on line 6—6, Fig. 4, and drawn to the same scale as said figure.

The wide-mouth baker's open to which my improvements are applied, is provided with suitable longitudinally disposed parallel metal tracks $a, a$, that enter the baking-chamber A thereof, and rest upon the hearth A' of said chamber adjacent to its side-walls. The forward ends of these tracks extend out of the oven door beyond the front wall thereof, and in cross-section said tracks consist, preferably, of a base rectangular in cross-section and a longitudinal rib $b$ on the upper surface of the said base.

A suitable distance above the baking-chamber the oven is provided with a warming-chamber C, the width and the depth of which corresponds to that of said baking chamber, and the rear corners of this warming-chamber C are connected to the rear corners of the baking chamber by vertical passages E, substantially as shown. This warming-chamber is also provided with longitudinal tracks $a', a'$, that are, preferably, the same shape in cross-section as tracks $a, a$, and are disposed in the same vertical planes thereas, and extend from the front of the oven to the vertical passages E. The entrance of this warming-chamber is roofed over by means of suitable metal awning F, which is, preferably, secured to the front wall thereof and extends to and has its edges terminate at a suitable point below the horizontal plane of the floor of the warming-chamber.

Endless chains 12 extend over suitable sprocket-wheels 13, 14, 15 and 16. Sprockets 13, 13, are mounted upon a transverse horizontal shaft 17 journaled in suitable brackets 18 secured to and projecting from the front of the oven; sprockets 14, 14, are, preferably, of greater diameter than the sprockets 13, and are mounted upon and secured to a transverse shaft 19, that is journaled in bearings in brackets secured to and projecting from the front of the furnace just above the plane of the ceiling or arch of the baking chamber, and sprockets 15, 15 and 16, 16, are, preferably, less in diameter than sprockets 13 and 14 and are mounted upon and secured to transverse shafts 20, 21, located at the rear of the warming chamber and baking chamber, respectively, and so as to direct the chain 12 into the warming chamber or from the warming-chamber into the baking chamber, as may be required. The arrangement of these chains or belts is such that they travel in a vertical plane between sprockets 13 and 14 and in a horizontal plane between sprockets 14 and 16, in a vertical plane up through the vertical passages E, and then in a horizontal plane between sprockets 15 and sprockets 13. A portion of this link chain, corresponding in length to the distance between sprockets 14 and 16, substantially as shown in Fig. 2 of the drawings, has, say, every fourth link, provided with transverse bearings for the trunnions 2, projecting from the adjacent ends of carriers 3, to which the ends of soap-stone trays are secured, as will hereinafter more fully appear. These carriers comprise a suitable casting of a length slightly less than the width of said tray, and of such width as to enable it to arch over the adjacent track. The underside of this casting is cored out so as to make it of an inverted channel shape between its closed ends, and in this cored out channel it is provided with suitable rollers 4, 4, loosely mounted on the spindles 5, 5, the ends of which latter are secured in the vertical walls of the channel, as shown. The periphery of these rollers are provided with circumferential grooves that are the obverse of the transverse dimensions of the ribs $b$ of the tracks $a'$, $a'$, upon which they are adapted to travel. The sides of these carriers farthest from the endless belts depend downward below the horizontal plane of the rollers and constitute hangers 6, that are provided with a transverse platform 7 projecting horizontally from the side thereof toward the opposite track. These carriers are arranged in pairs, right and left, one attached to each chain so that the axes of their trunnions aline, and the platforms 7 of each pair of carriers are connected by angle-irons 8. The ends of these angle-irons are attached to said platforms so that their horizontal members lap against and are secured to the underside of the platform and the vertical member of one of said angle irons rises above the end edges of said platform and together therewith form a channeled seat for the ends of the soap-stone trays 9. The weight of these trays 9 is so great that the horizontal stretches of the endless link belts would sag very materially if it were not for the tracks $a$, $a$, and $a'$ $a'$, and the carriers 3 traveling thereon. The trays being lower than the axes of the rollers will maintain their horizontal positions and will travel in the same horizontal plane within the baking chamber. When the bread in the pans supported by these trays within the baking chamber is baked, the endless belts are simultaneously moved outward so that the trays will, one after the other, move out of the "wide-mouth" door of the oven where the bread can be removed therefrom, and then the trays will be carried vertically up to the entrance of the warming-chamber and one after the other be moved into said chamber, within which the rollers will engage the upper tracks $a'$, $a'$. The trays will be carried back into this warming-chamber until they occupy the same relative positions therein as they do when in the baking chamber, and will there be kept in a heated condition ready for use when the next batch of dough is to be again placed on said trays and moved into the baking chamber.

What I claim as new is:

1. An oven of the class described comprising a lower baking chamber, an upper warming chamber, a vertical passage-way connecting the inner ends of said chambers, endless chains extending through the chambers and the passage-way and around the outer end of the intervening wall between the chambers, tracks in said chambers, and trays adapted to travel on said tracks and to be conveyed from one chamber to the other by the endless chains.

2. An oven of the class described comprising a structure having a long longitudinal baking chamber, a long horizontal warming chamber above the baking chamber, a vertical passage-way connecting the inner ends of said chambers; said inner chamber ends being closed except for the passage-way and the front ends thereof being open, upper and lower sprockets located at the front end of the structure, upper and lower sprockets located at the respective upper and lower ends of the vertical passage-way, an endless chain supported on said sprockets and extending through the passage-way and chambers, trays secured to said chain, and tracks within the chambers on which the trays travel.

3. In a baker's oven, a baking chamber, a warming compartment adjacent thereto, a door-opening of substantially the same width as said chamber, tracks extending from said door-opening to the rear of said chamber, endless chains passing through said chamber and warming compartment, elongated trays disposed transversely thereto, carriers on the ends of said trays that engage said chains, recesses in the undersides of said carriers, and anti-friction means mounted in said recesses and adapted to engage said tracks.

4. In a baker's oven, a baking chamber, a door opening of substantially the same width as said chamber, tracks extending from said door-opening to the rear of said chamber, endless chains movable through said chamber, elongated trays disposed transversely thereto, carriers on the ends of said trays that engage said chains, recesses in the undersides of said carriers, rollers journaled in said recesses having their axes parallel to the length of said trays and traveling on said tracks when said trays are inside said chamber.

5. An oven of the class described comprising a structure having a long longitudinal baking chamber, a long horizontal warming chamber above the baking chamber, a vertical passage-way connecting the inner ends of said chambers; said inner chamber ends being closed except for the passage-way and the front ends thereof being open, an awning over the open front end of the warming chamber, an upper sprocket located in said awning, a lower sprocket arranged in front of the baking chamber, upper and lower sprockets located at the respective upper and lower ends of the vertical passage-way, an endless chain supported on said sprockets and extending through the passage-way of the chambers beneath the awning and vertically in front of the oven, trays secured to said chain, and tracks within the chambers on which the trays travel.

In witness whereof I have hereunto set my hand this 9th day of August, 1913.

WILLIAM FERDINAND PETERSEN.

Witnesses:
E. K. LUNDY,
KENNETH M. HOLDEN.